US010467012B2

(12) United States Patent
Weissmann et al.

(10) Patent No.: US 10,467,012 B2
(45) Date of Patent: *Nov. 5, 2019

(54) APPARATUS AND METHOD FOR ACCELERATING OPERATIONS IN A PROCESSOR WHICH USES SHARED VIRTUAL MEMORY

(71) Applicant: Intel Corporation, Santa Clara, CA (US)

(72) Inventors: Eliezer Weissmann, Haifa (IL); Karthikeyan Karthik Vaithianathan, Bangalore (IN); Yoav Zach, Karkur (IL); Boris Ginzburg, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,458

(22) Filed: Dec. 29, 2016

(65) Prior Publication Data
US 2017/0153984 A1 Jun. 1, 2017

Related U.S. Application Data

(63) Continuation of application No. 15/221,557, filed on Jul. 27, 2016, which is a continuation of application (Continued)

(51) Int. Cl.
G06F 9/38 (2018.01)
G06F 12/1027 (2016.01)
(Continued)

(52) U.S. Cl.
CPC .......... G06F 9/3851 (2013.01); G06F 9/3881 (2013.01); G06F 9/3887 (2013.01);
(Continued)

(58) Field of Classification Search
CPC .... G06F 3/0646; G06F 3/0662; G06F 3/0668; G06F 12/0292; G06F 12/1027; G06F 12/109; G06F 13/38
(Continued)

(56) References Cited

U.S. PATENT DOCUMENTS 6,430,593 B1  8/2002 Lindsley
7,017,025 B1  3/2006 Kissell
(Continued)

FOREIGN PATENT DOCUMENTS

CN  101452423 A  6/2009
CN  101840355 A  9/2010
CN  102023932 A  4/2011

OTHER PUBLICATIONS

Advisory Action for U.S. Appl. No. 13/994,577, dated Jan. 5, 2016, 03 pages.
(Continued)

Primary Examiner — Tracy A Warren
(74) Attorney, Agent, or Firm — Nicholson De Vos Webster & Elliott LLP

(57) ABSTRACT

An apparatus and method are described for coupling a front end core to an accelerator component (e.g., such as a graphics accelerator). For example, an apparatus is described comprising: an accelerator comprising one or more execution units (EUs) to execute a specified set of instructions; and a front end core comprising a translation lookaside buffer (TLB) communicatively coupled to the accelerator and providing memory access services to the accelerator, the memory access services including performing TLB lookup operations to map virtual to physical addresses on behalf of the accelerator and in response to the accelerator requiring access to a system memory.

14 Claims, 13 Drawing Sheets

Related U.S. Application Data

No. 13/994,577, filed as application No. PCT/US2012/031676 on Mar. 30, 2012, now Pat. No. 9,405,701.

(51) Int. Cl.

| | |
|---|---|
| *G06F 12/1009* | (2016.01) |
| *G06F 12/1081* | (2016.01) |
| *G06F 12/1072* | (2016.01) |
| *G06F 12/0875* | (2016.01) |
| *G06F 12/0811* | (2016.01) |
| *G06F 12/084* | (2016.01) |
| *G06F 12/1045* | (2016.01) |
| G06F 3/06 | (2006.01) |
| G06F 12/02 | (2006.01) |
| G06F 12/14 | (2006.01) |

(52) U.S. Cl.
CPC ........ *G06F 12/084* (2013.01); *G06F 12/0811* (2013.01); *G06F 12/0875* (2013.01); *G06F 12/1009* (2013.01); *G06F 12/1027* (2013.01); *G06F 12/1045* (2013.01); *G06F 12/1072* (2013.01); *G06F 12/1081* (2013.01); *G06F 3/0646* (2013.01); *G06F 3/0662* (2013.01); *G06F 3/0668* (2013.01); *G06F 12/0292* (2013.01); *G06F 12/145* (2013.01); *G06F 12/1441* (2013.01); *G06F 2212/1024* (2013.01); *G06F 2212/283* (2013.01); *G06F 2212/302* (2013.01); *G06F 2212/452* (2013.01); *G06F 2212/60* (2013.01); *G06F 2212/62* (2013.01); *G06F 2212/65* (2013.01); *G06F 2212/68* (2013.01); *G06F 2212/683* (2013.01); *G06F 2212/684* (2013.01)

(58) Field of Classification Search
USPC ........ 711/207, 209, 221; 710/104, 308, 311; 712/11, 14, 225, 248
See application file for complete search history.

(56) References Cited

U.S. PATENT DOCUMENTS

| | | | |
|---|---|---|---|
| 7,318,128 B1 | 1/2008 | Dice | |
| 7,389,403 B1 | 6/2008 | Alpert et al. | |
| 9,405,701 B2 | 8/2016 | Weissmann et al. | |
| 2004/0064653 A1 | 4/2004 | Gharachorloo et al. | |
| 2004/0088487 A1 | 5/2004 | Barroso et al. | |
| 2004/0160446 A1 | 8/2004 | Gosalia et al. | |
| 2004/0227763 A1 | 11/2004 | Wichman et al. | |
| 2005/0050297 A1* | 3/2005 | Essick, IV .......... G06F 12/1036 711/207 |
| 2005/0223380 A1 | 10/2005 | Chun et al. | |
| 2006/0101241 A1 | 5/2006 | Curran et al. | |
| 2007/0011433 A1 | 1/2007 | Vorbach | |
| 2007/0157211 A1 | 7/2007 | Wang et al. | |
| 2008/0222383 A1* | 9/2008 | Spracklen ........... G06F 12/1027 711/207 |
| 2009/0150620 A1* | 6/2009 | Paver .................... G06F 9/3879 711/146 |
| 2009/0216958 A1 | 8/2009 | Biles et al. | |
| 2009/0228667 A1 | 9/2009 | Koehler et al. | |
| 2009/0249349 A1 | 10/2009 | Bose et al. | |
| 2010/0153686 A1 | 6/2010 | Frank | |
| 2010/0174868 A1 | 7/2010 | Vorbach | |
| 2010/0191909 A1 | 7/2010 | Archer et al. | |
| 2011/0072234 A1* | 3/2011 | Chinya ............... G06F 12/1027 711/207 |
| 2011/0161619 A1 | 6/2011 | Kaminski et al. | |
| 2011/0161620 A1* | 6/2011 | Kaminski ........... G06F 12/1009 711/207 |
| 2011/0191539 A1 | 8/2011 | Hugosson et al. | |
| 2012/0239904 A1 | 9/2012 | Ekanadham et al. | |
| 2013/0205119 A1 | 8/2013 | Rajwar et al. | |
| 2014/0089637 A1 | 3/2014 | Merchant et al. | |
| 2014/0189332 A1 | 7/2014 | Ben-Kiki et al. | |
| 2014/0189426 A1 | 7/2014 | Ben-Kiki et al. | |
| 2014/0201421 A1 | 7/2014 | Schoenberg | |
| 2014/0237185 A1 | 8/2014 | Solihin | |
| 2015/0070368 A1 | 3/2015 | Wang et al. | |
| 2016/0335090 A1 | 11/2016 | Weissmann et al. | |
| 2017/0109281 A1 | 4/2017 | Weissmann et al. | |
| 2017/0109294 A1 | 4/2017 | Weissmann et al. | |

OTHER PUBLICATIONS

Extended European Search Report for Application No. 12873212.0, dated Sep. 22, 2015, 7 pages.
Final Office Action from U.S. Appl. No. 13/994,577, dated Oct. 5, 2015, 12 pages.
International Preliminary Report on Patentability for Application No. PCT/US2012/031676, dated Oct. 1, 2014, 7 pages.
International Search Report and the Written Opinion for Application No. PCT/US2012/031676, dated Oct. 31, 2012, 10 pages.
Lange H., et al., "Architectures and Execution Models for Hardware/Software Compilation and Their System-Level Realization," IEEE Transactions on Computers, 2010, vol. 59 (10), pp. 1363-1377.
Non-Final Office Action from U.S. Appl. No. 13/994,577, dated Mar. 27, 2015, 7 pages.
Non-Final Office Action from U.S. Appl. No. 15/221,557, dated Oct. 4, 2016, 7 pages.
Notice of Allowance from U.S. Appl. No. 13/994,577, dated Apr. 8, 2016, 05 pages.
First Office Action and Search Report from foreign counterpart China Patent Application No. 201280072078.3, dated Apr. 5, 2016, 22 pages.
Second Office Action from foreign counterpart China Patent Application No. 201280072078.3, dated Nov. 29, 2016, 19 pages.
Villavieja C., et al., "Di Di: Mitigating the Performance Impact of TLB Shootdowns Using a Shared TLB Directory," Parallel Architectures and Compilation Techniques (PACT), 2011 International Conference on IEEE, Oct. 10, 2011, XP032083342, pp. 340-349.
Final Office Action from U.S. Appl. No. 15/221,557, dated Apr. 18, 2017, 8 pages.
Fourth Office Action from foreign counterpart China Patent Application No. 201280072078.3, dated Sep. 7, 2017, 7 pages.
Intention to Grant a Patent for Application No. 12873212.0, dated Nov. 28, 2017, 47 pages.
Non-Final Office Action from U.S. Appl. No. 15/221,557, dated Sep. 15, 2017, 27 pages.
Non-Final Office Action from U.S. Appl. No. 15/394,493, dated Dec. 29, 2017, 12 pages.
Non-Final Office Action from U.S. Appl. No. 15/394,493, dated Jun. 16, 2017, 22 pages.
Non-Final Office Action from U.S. Appl. No. 15/394,539, dated Jun. 27, 2017, 31 pages.
Notice of Allowance from U.S. Appl. No. 15/394,539, dated Jan. 3, 2018, 8 pages.
Notice on Grant of Patent Right for Invention from foreign counterpart China Patent Application No. 201280072078.3, dated Dec. 19, 2017, 4 pages.
Third Office Action from foreign counterpart China Patent Application No. 201280072078.3, dated May 15, 2017, 10 pages.
Decision to grant a European patent pursuant to Article 97(1) EPC for Application No. 12873212.0, dated May 17, 2018, 2 pages.
Extended European Search Report for Application No. 18169631.1, dated May 28, 2018, 8 pages.
Final Office Action from U.S. Appl. No. 15/394,493, dated Jun. 28, 2018, 18 pages.
Notice of Allowance from U.S. Appl. No. 15/221,557, dated May 18, 2018, 20 pages.
Corrected Notice of Allowance from U.S. Appl. No. 15/221,557, dated Aug. 15, 2018, 10 pages.
Non-Final Office Action from U.S. Appl. No. 15/394,493, dated Nov. 8, 2018, 23 pages.

(56) References Cited

OTHER PUBLICATIONS

Final Office Action from U.S. Appl. No. 15/394,493, dated Mar. 8, 2019, 22 pages.
Communication pursuant to Rule 94(3) EPC for Application No. 18169631.1, dated Apr. 4, 2019, 6 pages.

* cited by examiner

APPARATUS AND METHOD FOR ACCELERATING OPERATIONS IN A PROCESSOR WHICH USES SHARED VIRTUAL MEMORY

CROSS REFERENCE TO RELATED APPLICATIONS

This application is a continuation of co-pending U.S. patent application Ser. No. 15/221,557, and titled, "Apparatus and Method For Accelerating Operations In A Processor Which Uses Shared Virtual Memory", filed Jul. 27, 2016, which is a continuation application claiming priority to U.S. patent application Ser. No. 13/994,577, filed Jun. 14, 2013, and titled, "Apparatus And Method For Accelerating Operations In A Processor Which Uses Shared Virtual Memory", which is a U.S. National Phase Application under 35 U.S.C. § 371 of International Application No. PCT/US2012/31676, filed Mar. 30, 2012, and titled, "Apparatus And Method For Accelerating Operations In A Processor Which Uses Shared Virtual Memory", all of which are incorporated herein by reference in their entirety.

FIELD OF THE INVENTION

Embodiments of the invention relate generally to the field of computer systems. More particularly, the embodiments of the invention relate to an apparatus and method for accelerating operations in a computer processor which uses shared virtual memory.

BACKGROUND

An instruction set, or instruction set architecture (ISA), is the part of the computer architecture related to programming, and may include native data types, instructions, register architecture, addressing modes, memory architectures, interrupts, exception handling, and external input and output (I/O) operations. The term instruction generally refers herein to macro-instructions—that is, instructions that are provided to the processor (or instruction converter that translates (e.g., using static binary translation, dynamic binary translation including dynamic compilation), morphs, emulates, or otherwise converts an instruction to one or more other instructions to be processed by the processor) for execution—as opposed to micro-instructions or micro-operations ("micro-ops" or "µops")—which is the result of a processor's decoder decoding macro-instructions.

The ISA is distinguished from the microarchitecture, which is the internal design of the processor implementing the instruction set. Processors with different microarchitectures can share a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB), and a retirement register file; the use of multiple maps and a pool of registers), etc. Unless otherwise specified, the phrases register architecture, register file, and register are used herein to refer to that which is visible to the software/programmer and the manner in which instructions specify registers. Where a specificity is desired, the adjective logical, architectural, or software visible will be used to indicate registers/files in the register architecture, while different adjectives will be used to designation registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform an operation on multiple data items. SIMD technology is especially suited to processors that can logically divide the bits in a register into a number of fixed-sized data elements, each of which represents a separate value. For example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as packed data type or vector data type, and operands of this data type are referred to as packed data operands or vector operands. In other words, a packed data item or vector refers to a sequence of packed data elements, and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that has only one or has more than two source vector operands, that operate in a horizontal fashion, that generates a result vector operand that is of a different size, that has a different size data elements, and/or that has a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction).

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance. An additional set of SIMD extensions, referred to the Advanced Vector Extensions (AVX) (AVX1 and AVX2) and using the Vector Extensions (VEX) coding scheme, has been released and/or published (e.g., see Intel® 64 and IA-32 Architectures Software Developers Manual, October 2011; and see Intel® Advanced Vector Extensions Programming Reference, June 2011).

BRIEF DESCRIPTION OF THE DRAWINGS

The following description and accompanying drawings are used to illustrate embodiments of the invention. In the drawings.

DETAILED DESCRIPTION

Exemplary Processor Architectures and Data Types

Figure 1:
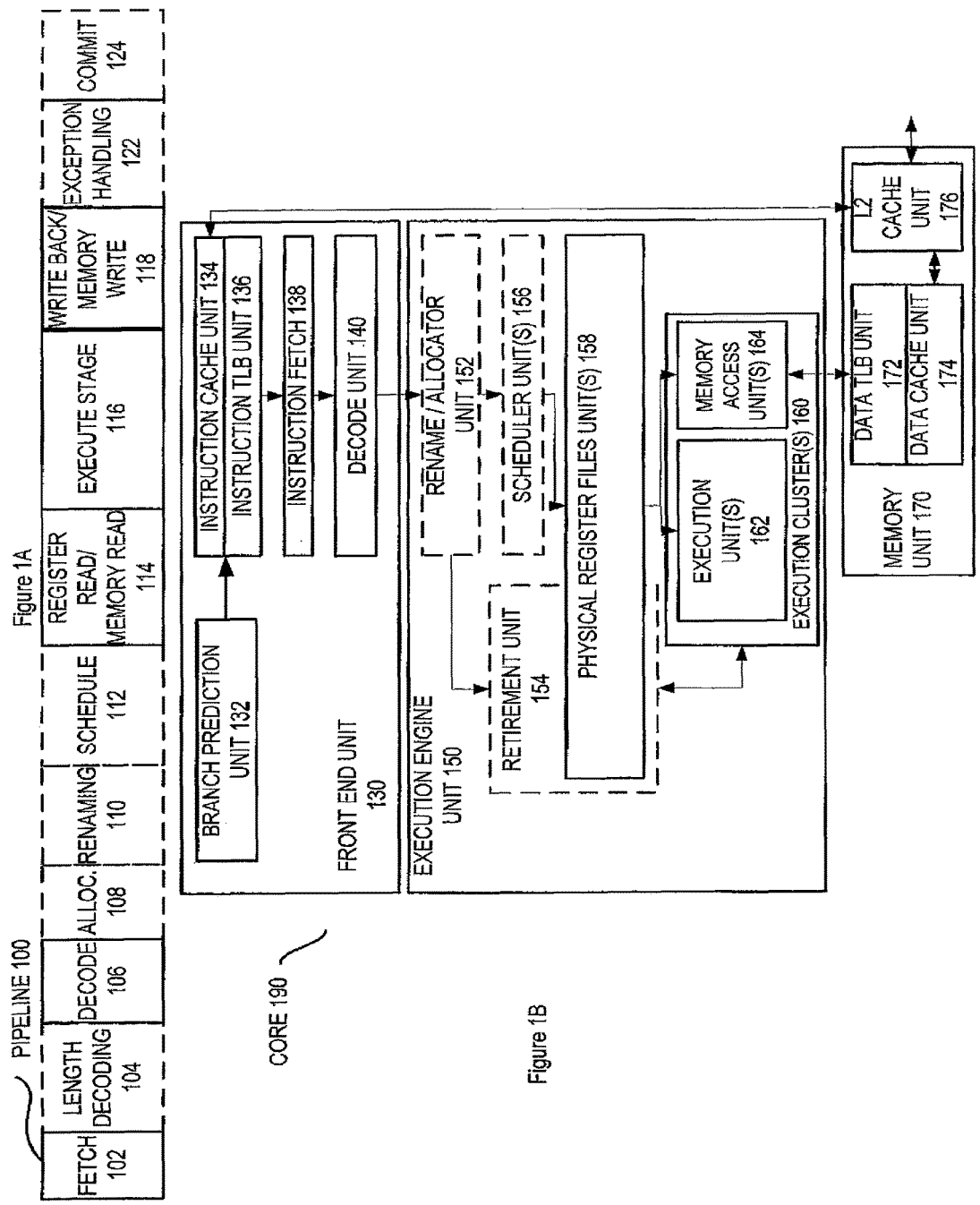
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction's addresses translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data's addresses TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
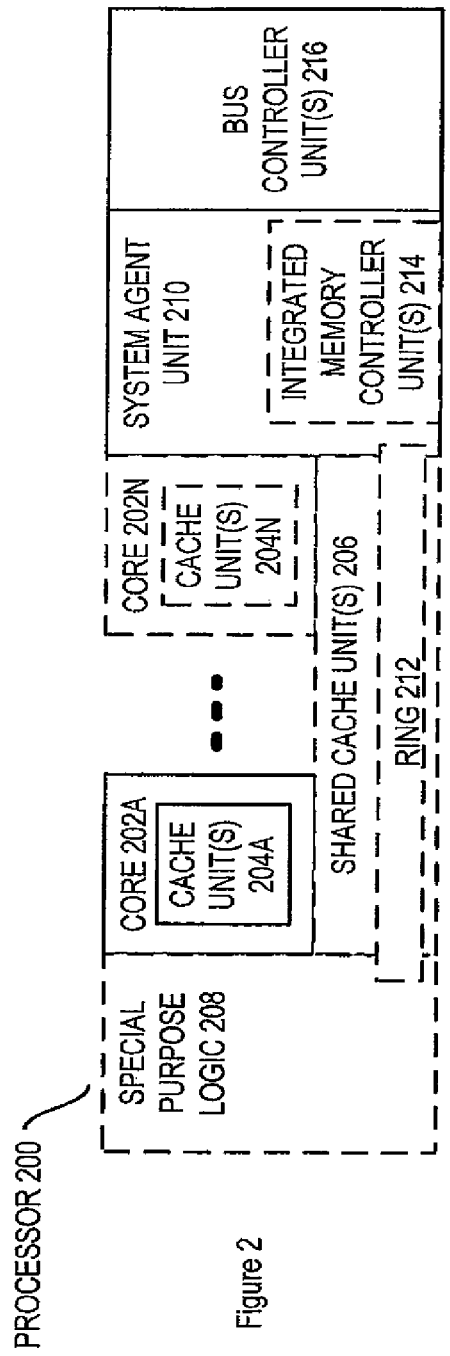
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
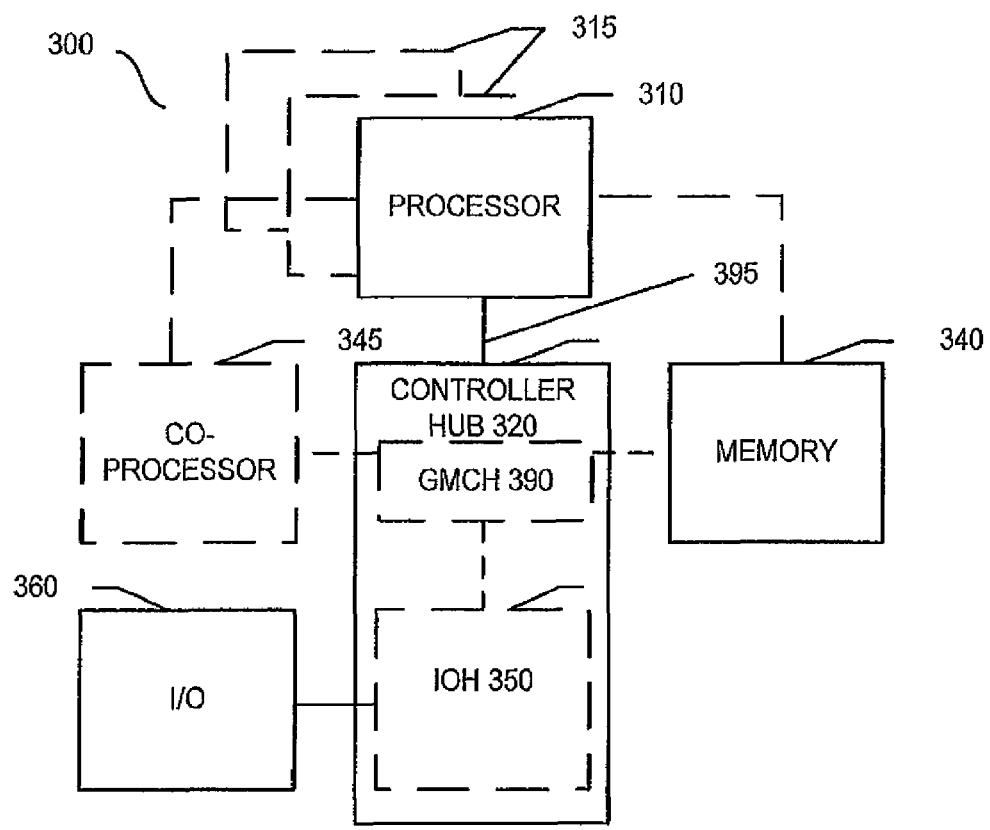
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
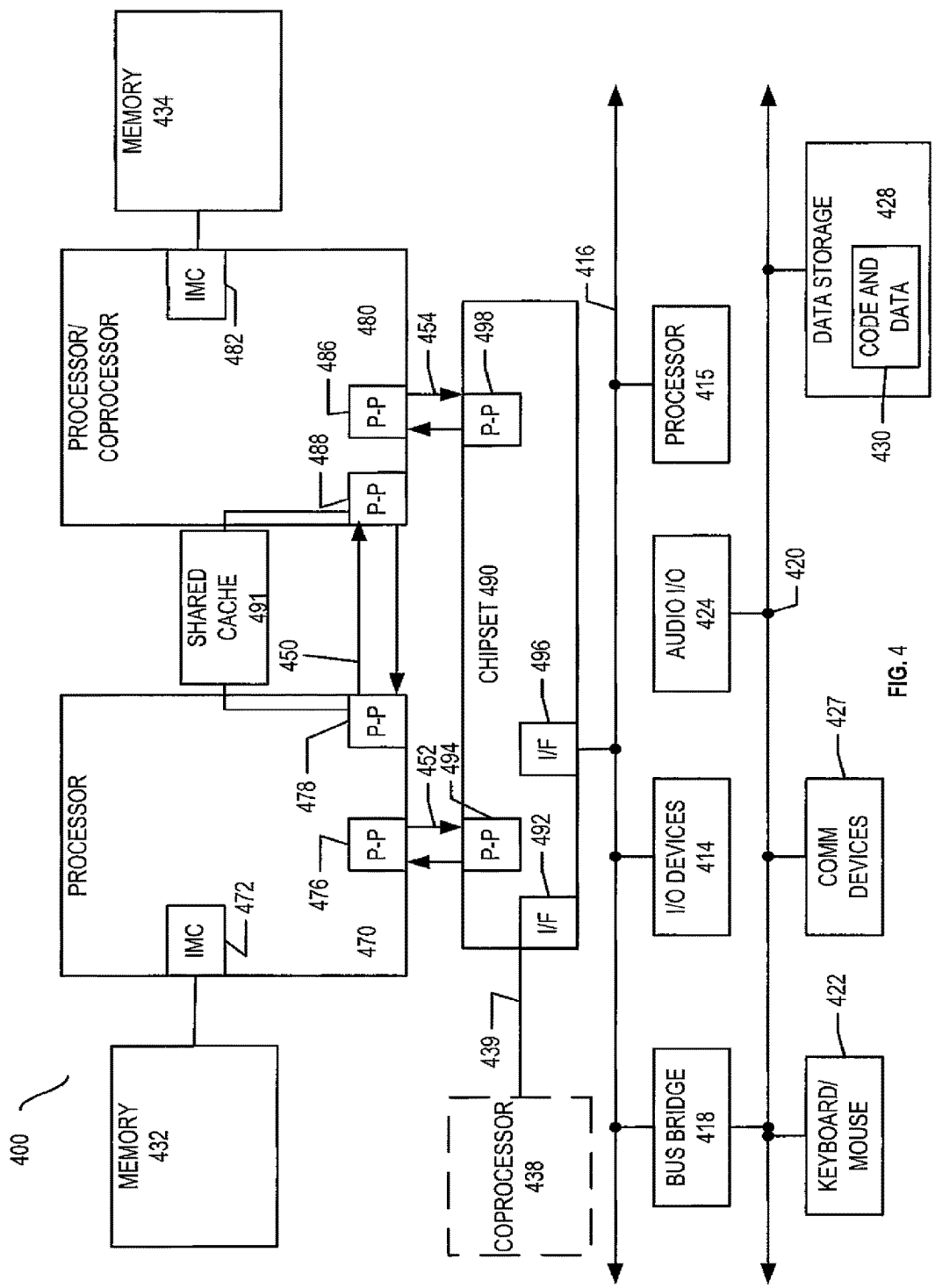
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488.

Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache 491 may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
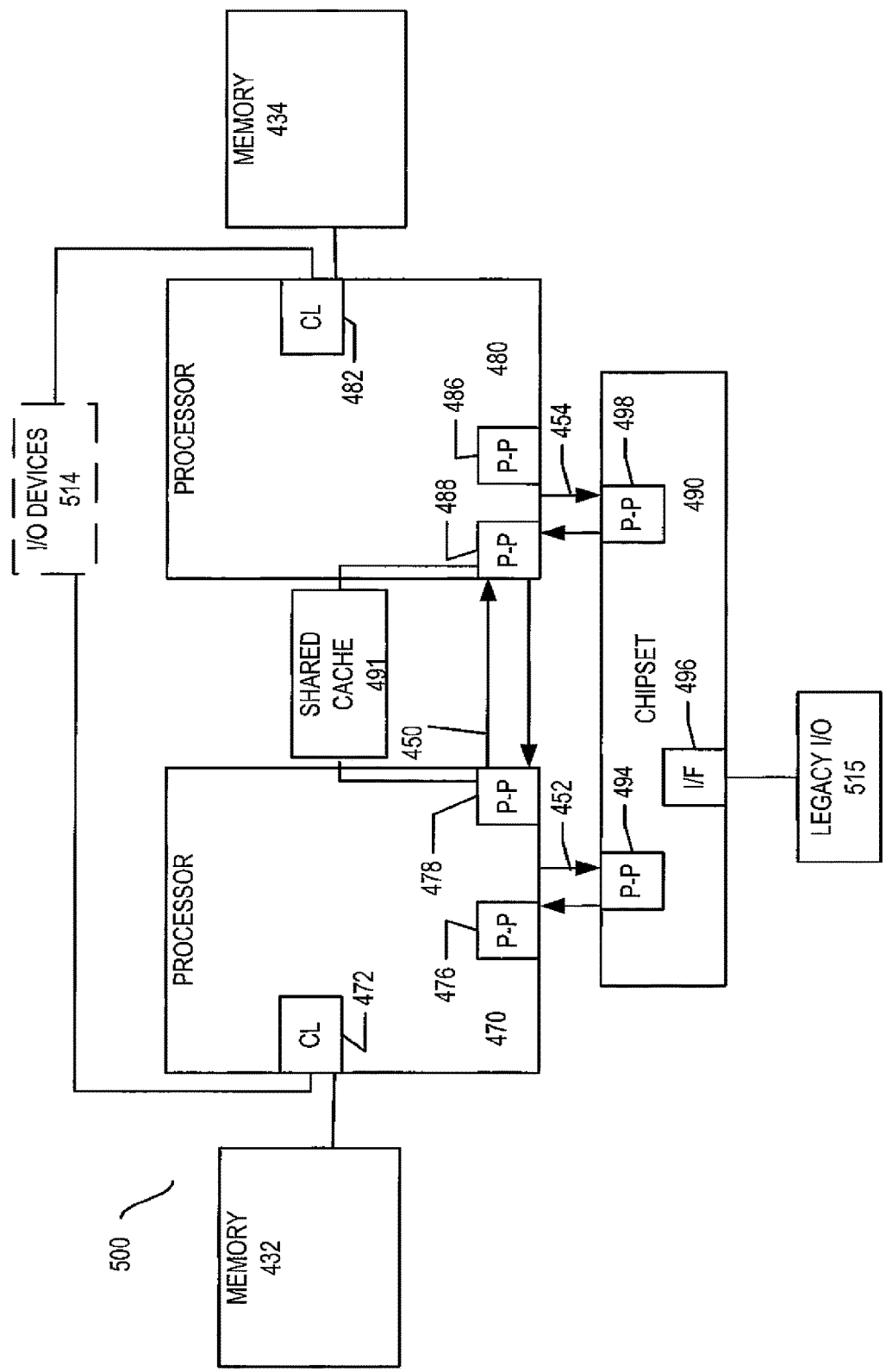
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
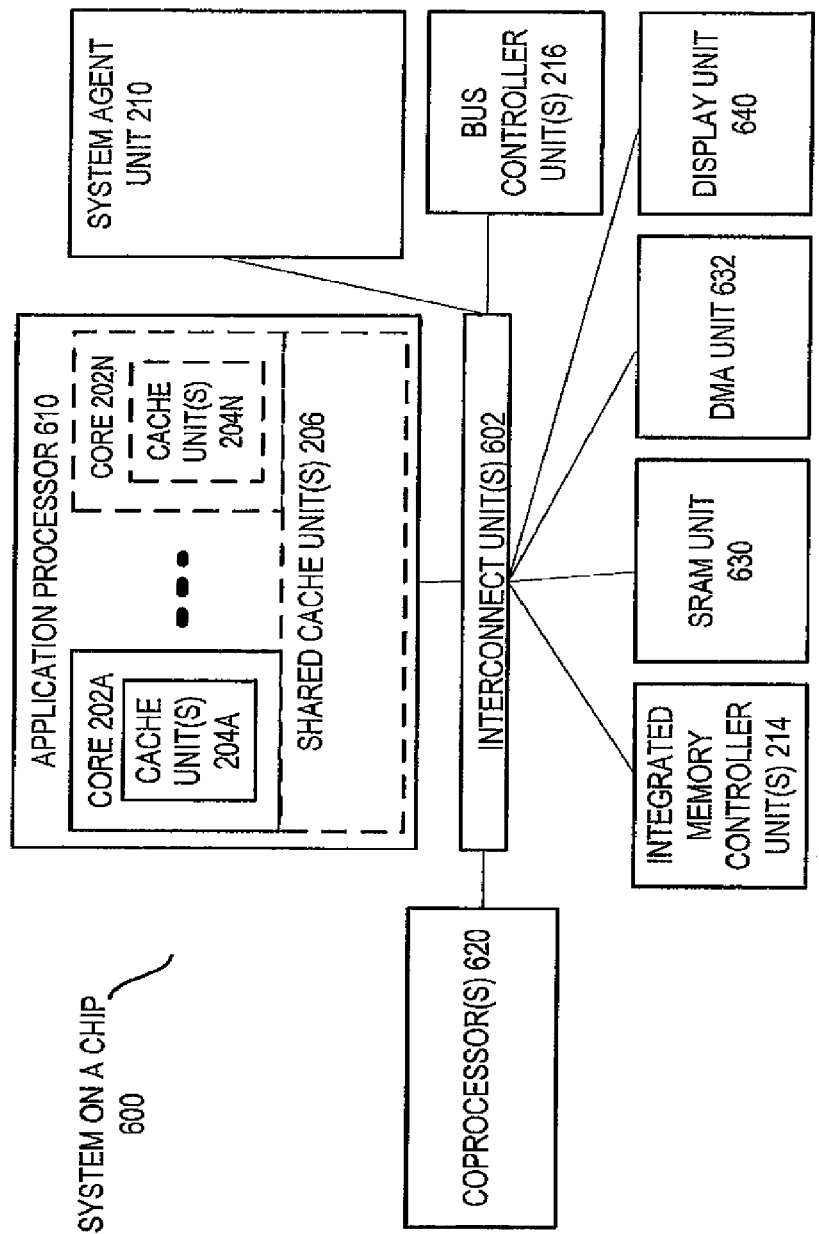
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like. This coprocessor ether support the same ISA as the application processor or has different type and method of control instructions or control registers interface Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
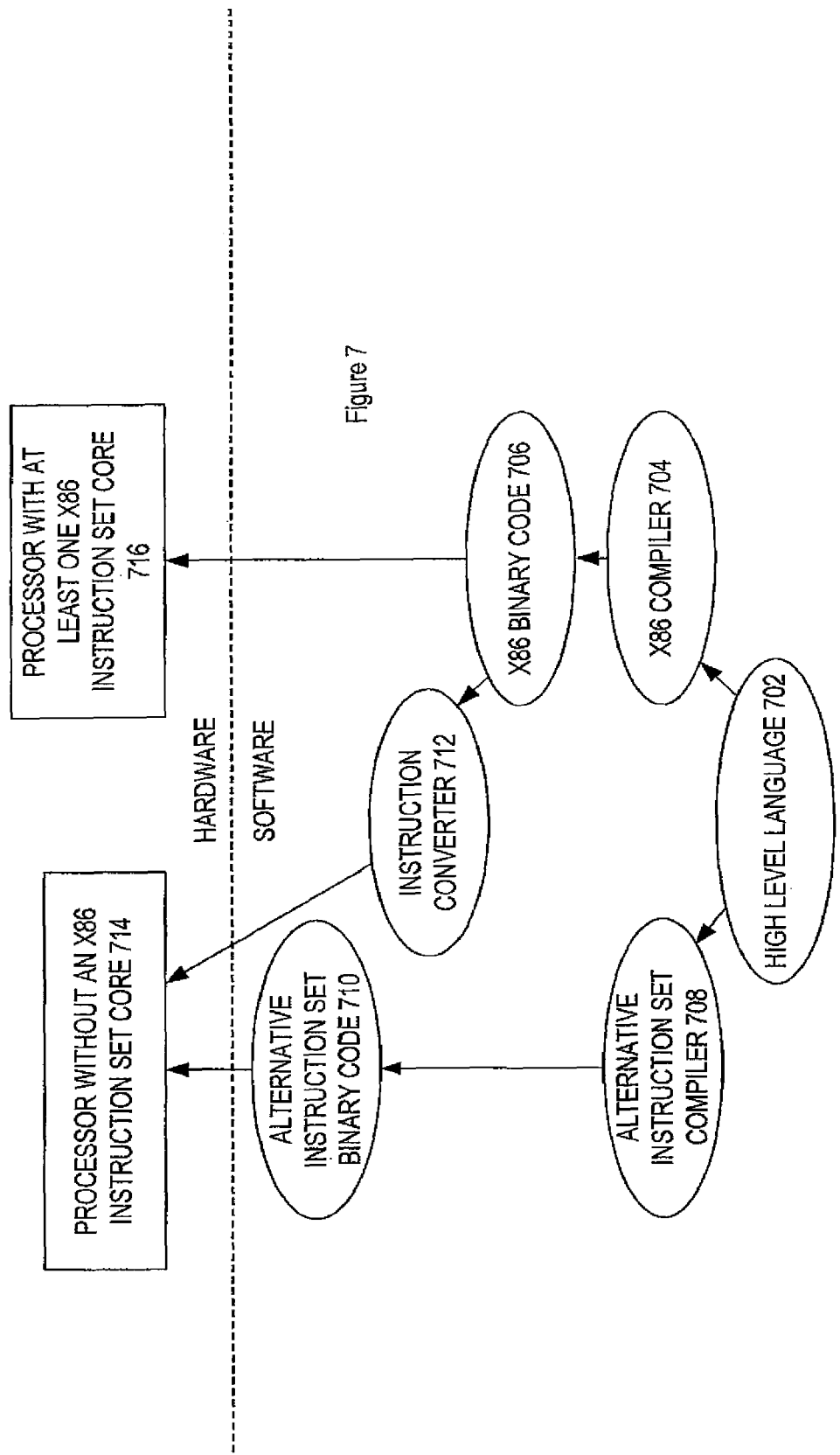
FIG. 7 illustrates a block diagram contrasting the use of a software instruction converter to convert binary instructions in a source instruction set to binary instructions in a target instruction set according to embodiments of the invention.
Figure 8:
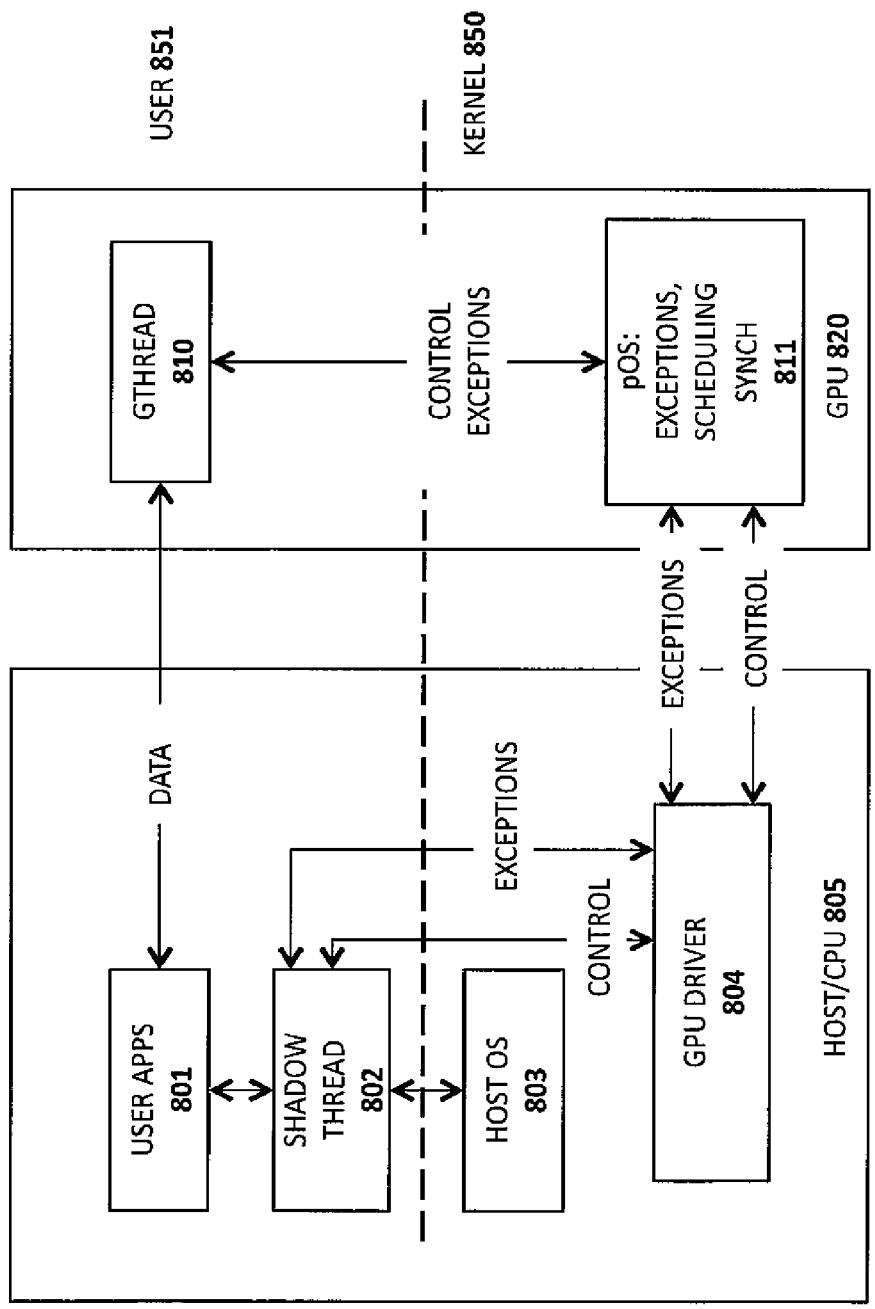
FIG. 8 illustrates a current implementation for handling page faults in a system in which a central processing unit and graphics processing unit share a virtual memory.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706. The instruction converter 712's binary code is ether base on x86 instruction set or base on the none x86 instruction set. It is means that the actual converted from x86 into the alternative instruction ether happened on the x86 processor or on top the processor without the x86 support Apparatus and Method for Accelerating Operations in a Processor which Uses Shared Virtual Memory Future processors designed by the assignee of the present patent application (and potentially others) will use Shared Virtual Memory (SVM) between the central processing unit (CPU) and graphics processing unit (GPU). FIG. 8 illustrates one such implementation in which code running on GPU 820—illustrated as a graphics thread (GTHREAD) 810 within the user space 851—uses the same virtual memory of application 801 running on the CPU 805. Also shown in FIG. 8 is a host operating system 803 and synchronization logic 811 executed within the kernel layer 850 of the CPU and GPU, respectively.

Access to the shared virtual memory by the GPU 820 can result in Page Fault (PF) condition, e.g., if the corresponding virtual page is not present in system memory (e.g., dynamic random access memory or DRAM), or if there is "access right" violation (e.g. when the GPU 820 attempts to write to a "read-only" memory page).

The current schema used to address GPU page fault conditions assumes that GPU-generated page fault is forwarded to the GPU's driver 804, which resolves the page fault condition through a shadow thread 802. The shadow thread 802 may resolve this page fault either by generating by itself the same page fault in order to get support from its native operating system or by accessing into the operating system through a defined API in order to get direct support from the operating system for fault memory address access. This driver-based page fault handling schema is significantly slower than "native" CPU page fault handling. We estimate the time required to handle page faults on the GPU 820 in this manner to be on the order of 3× slower compared to handling of page faults on the CPU 805. This schema also involves host CPU overhead related to handling GPU faults on CPU. The decrease in performance noted above occurs primarily due to the fact that the page fault event is treated differently than a regular page fault which only counts as a single processor exception.

The embodiments of the invention described below minimizes the amount of CPU overhead due to page fault handling on shared virtual memory (SVM)-capable accelerator (e.g., such as a GPU). Additionally, these embodiments use native operating system (OS) virtual memory support for SVM-capable devices, instead of using the inefficient driver-based mechanism described above.

Figure 9:
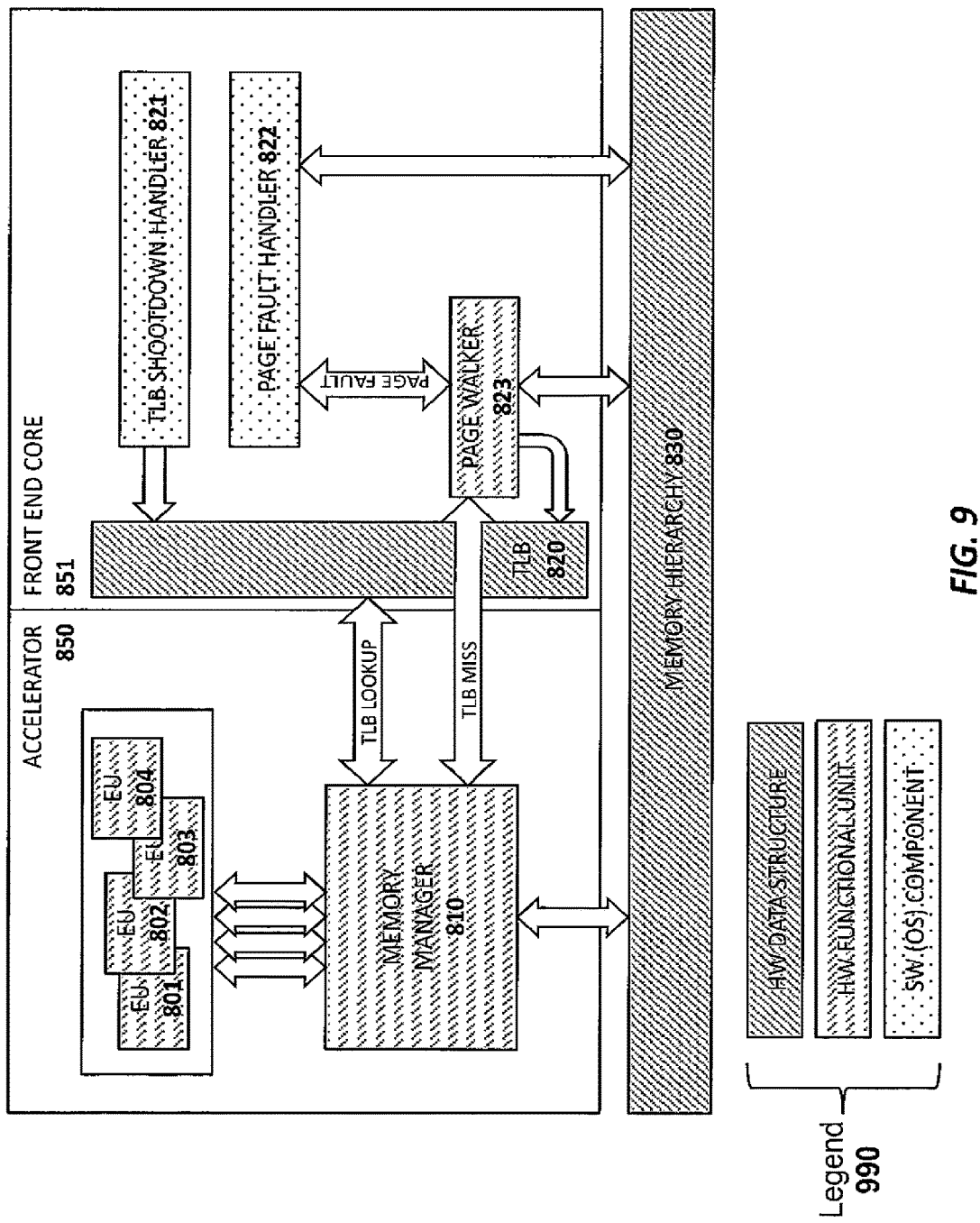
FIG. 9 illustrates one embodiment of the invention comprising an accelerator component and a front end core.

FIG. 9 illustrates one embodiment of the invention which includes a front end core 851 to an accelerator component 850. In one embodiment, the front end core is an Intel Architecture (IA) core capable of executing native (e.g., x86) operating system code (although the underlying principles of the invention are not limited to an IA core). As indicated by the legend 990, which identifies fill patterns for different types of components, the front end core 851 and accelerator 850 include various hardware data structures, hardware functional units and software (e.g., operating system) components. In particular, the front end core 851 of the illustrated embodiment includes a translation lookaside buffer (TLB), a cache that the memory manager 810 of the accelerator uses to improve virtual address translation speed. In particular, the TLB has a fixed number of slots that contain page table entries each of which maps a virtual addresses to a physical addresses. When attempting to access a particular page within the virtual address space, the memory manager 810 performs a TLB lookup as illustrated. If the virtual-to-physical mapping is present in the TLB, then the physical address is provided to the memory manager 810 which may then access the memory hierarchy 830 using the physical address.

A "TLB miss" results if the virtual-to-physical mapping is not present in the TLB 820. This TLB serves both the front end core 851 and the accelerator 850. In one embodiment, in response to a TLB miss, the memory manager 810 accesses a page walker module 823 which provides page walk services to the accelerator 850. The page walk hardware support may be part of the front end core 851 and may be used also by the front end core as part of its regular execution path. One alternative is to include the page walk hardware support as part of the accelerator memory manager 810. As is known by those of skill in the art, a page walk involves looking up the address mapping in the page table (stored in memory 830) to determine whether a mapping exists. In one embodiment, if one exists, it is written back to the TLB 820. The subsequent execution of the faulting instruction will result in a TLB hit and the memory access will continue as previously described. If a mapping does not exist, then the faulting exception is restarted by the page fault handler software 822.

In one embodiment, the TLB shootdown handler 821 is also implemented as software executed on the front end core 851. As is understood by those of ordinary skill in the art, a TLB shootdown operation may be used if a system component (e.g., an accelerator execution unit 801-804 or another front end core) has restricted access to a particular page contained in the memory 830. In such a case, the TLBs of other accelerators/cores must be flushed to remove any entries for this restricted page (i.e., so that the other accelerators/cores which are not permitted to access the page cannot do so). This is done in order to force the TLB to re-load this page with its new attributes (e.g., read only). The action of one core causing the TLBs of the other cores to be flushed is referred to as a "TLB shootdown." In one embodiment, the TLB shootdown is driven by the operating system and its primary focus is to set the execution units in a known state that does not include access into the support memory pages or include a partial access into the memory like read only. In one embodiment, it will be up to the front end core to have a method to stop the accelerator memory access during TLB shootdown event and set it in a known state during modification of the page table.

In one embodiment, the software executed on the front end core 851 including the page fault handler 822 and TLB shootdown handler 821 is implemented as native operating system code (e.g., x86 code if the front end core is an Intel Architecture (IA) core). As mentioned, this code handles page faults and participates in the operating system TLB shootdown procedure. In addition, in one embodiment, the native OS code schedules tasks on the accelerator. In particular, the OS code may schedule tasks to be executed by one or more of the accelerator execution units (EUs) 801-804.

In one embodiment, the TLB 820 is implemented as a content addressable memory (CAM), although the underlying principles of the invention are not limited to any particular TLB type. The TLB is a component which is well understood by those of skill in the art and will therefore not be described here in detail to avoid obscuring the underlying principles of the invention.

In summary, in one embodiment of the invention, a light weight front end core 851 is added to every accelerator 850 that supports shared virtual memory (SVM). This front end core acts as the memory management unit for the accelerator 850. In one embodiment, it is visible to the operating system (OS) as a special CPU (an Intel Architecture CPU in one embodiment) and is able to run a small subset of the OS code.

The described apparatus and method provides improvements over existing implementations in which MMU services are provided to SVM-capable accelerators by a hardware component (IOMMU2), which performs a page walk in case of a device TLB miss. In case of PF, IOMMU2 uses interrupts to notify its driver, which resolves the PF and sends back a response. As previously described, using the IOMMU2 in this manner is very cumbersome and inefficient because it involves two way interrupts.

In addition to simplifying the memory management support by the front end core, this core can be used by the OS as the end point for task scheduling that is supposed to run on the accelerator. This method request that the OS will be aware about the type of the accelerator and will target to its front end core, a task that is supposed to be executed on top of this accelerator. In order to support this method, the accelerator must include the option to save and restore its context as a result of request that will follow from the front end core. This save and restore capabilities will be used as part of OS task switch.

Figure 10A:
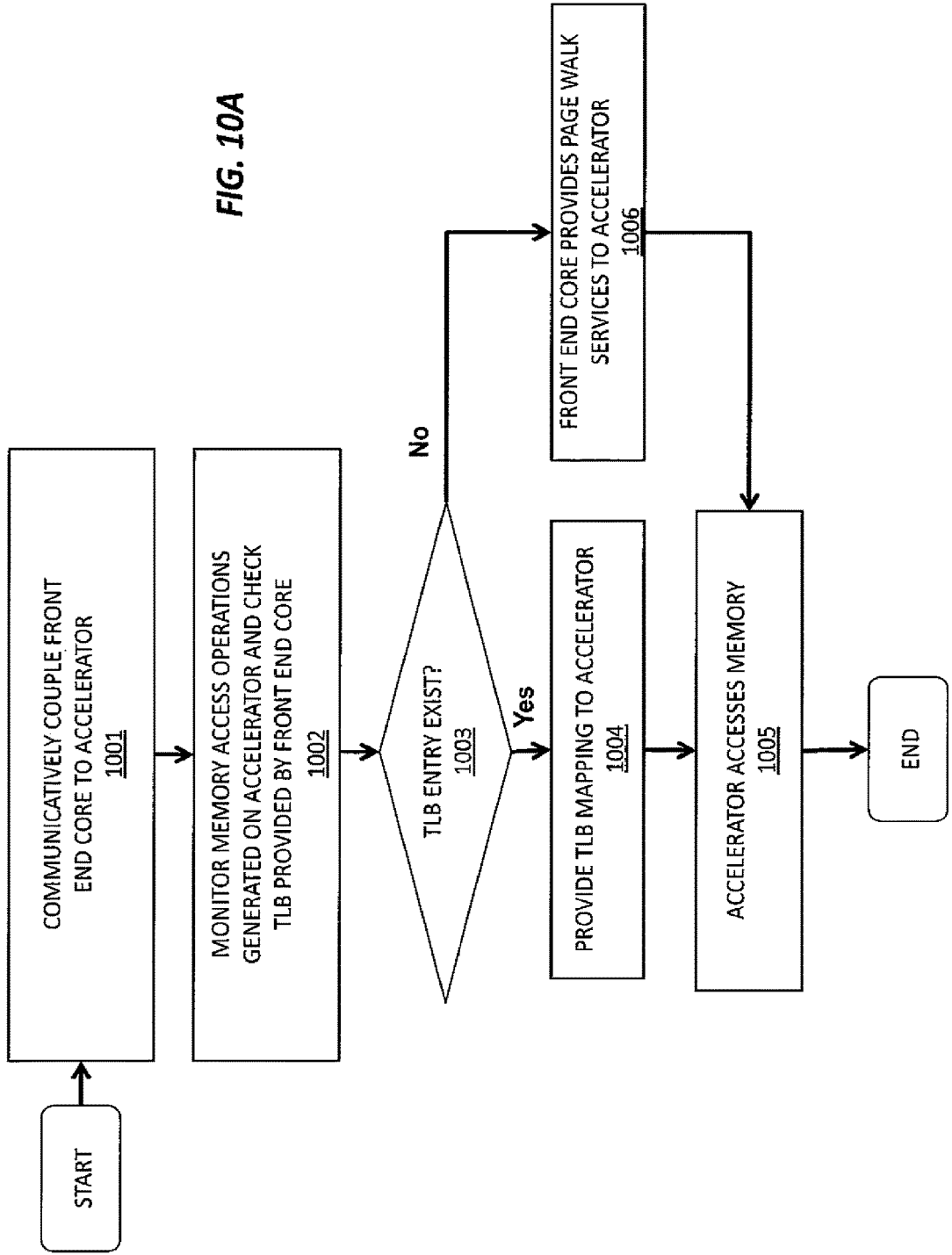
FIGS. 10A-C illustrates methods in accordance with different embodiments of the invention.

FIG. 10A illustrates a method in accordance with one embodiment of the invention. At 1001, a front end core is communicatively coupled to an accelerator. As mentioned, the front end core of one embodiment executes a lightweight set of OS code and includes a TLB, a page walker module, page fault handler, and TLB shootdown handler. At 1002, memory access operations generated by the accelerator are detected by the front end core, which checks its TLB for an entry needed to handle the memory access. If an entry exists (determined at 1003), then at 1004, the TLB mapping is provided to the accelerator. If not, then at 1006, the front end core provides page walker services to the accelerator to determine the virtual to physical mapping. IN either case, at 1005, the accelerator accesses the memory using the mapping provided by the front end core.

Figure 10B:
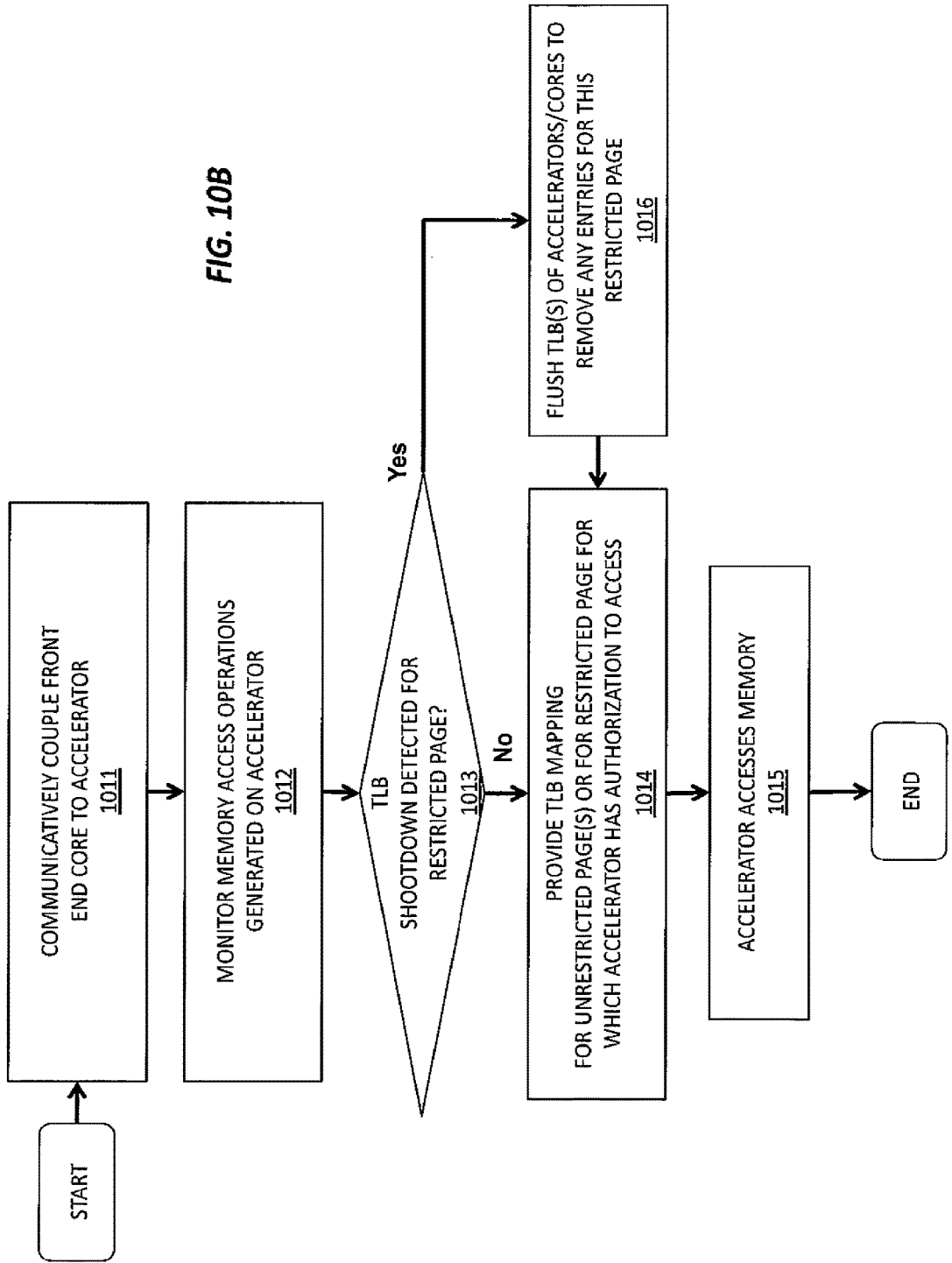

FIG. 10B illustrates an exemplary method for implemented on the architecture shown in FIG. 9 for processing a TLB shootdown operation. At 1011, a front end core is communicatively coupled to an accelerator. As mentioned, the front end core of one embodiment executes a lightweight set of OS code and includes a TLB, a page walker module, page fault handler, and TLB shootdown handler. At 1012, memory access operations generated by the accelerator are detected by the front end core, which checks its TLB for an entry needed to handle the memory access. If a TLB shootdown operation is detected at 1013, then at 1016, the TLB(s) of accelerators/cores are flushed to remove any entries for the restricted page. At 1014, a TLB mapping for an unrestricted page, or for a restricted page for which the current accelerator is authorized at access is provided to the requesting accelerator. At 1015 the accelerator accesses the memory using the mapping provided by the front end core.

Figure 10C:
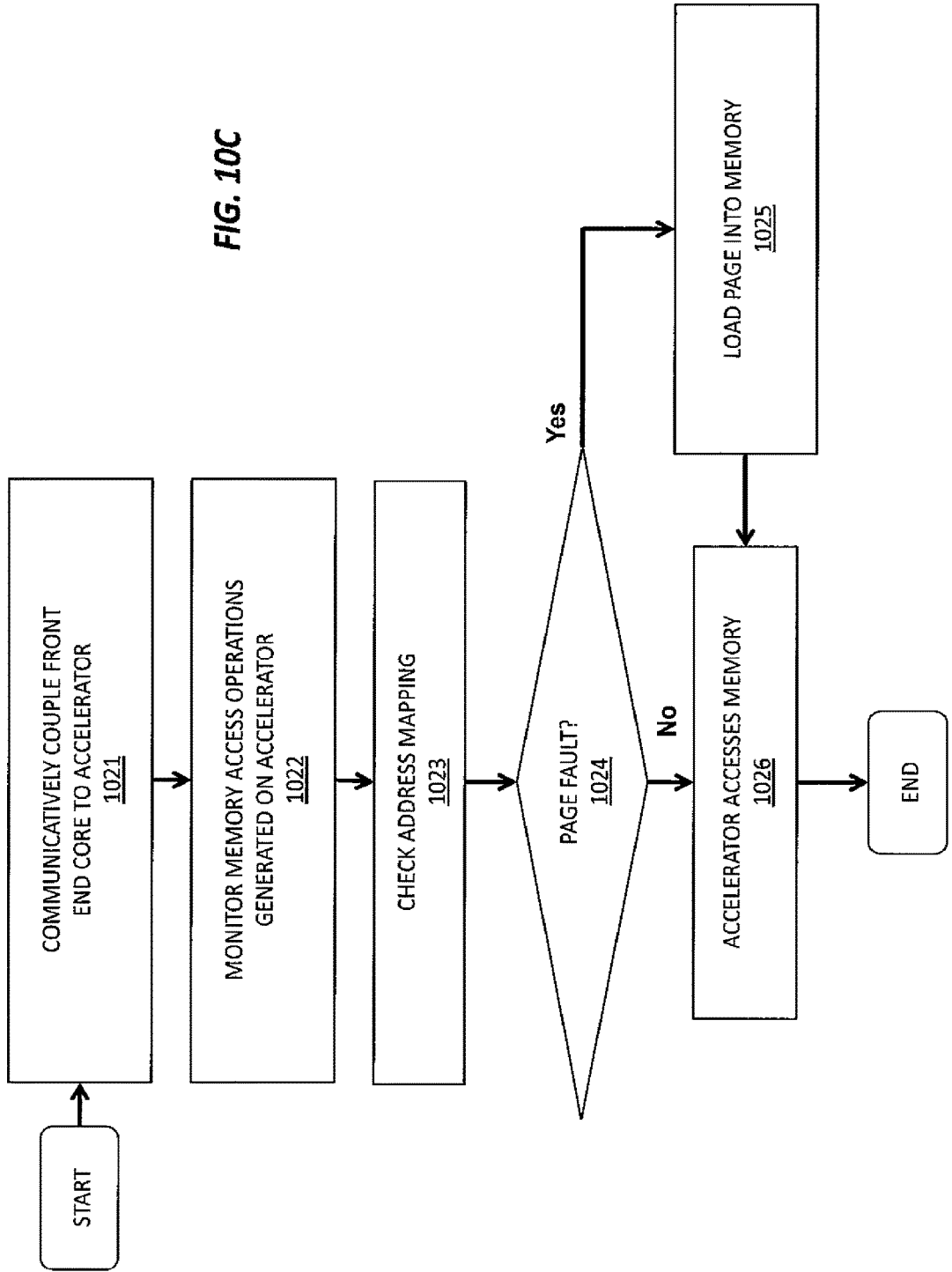

FIG. 10C illustrates an exemplary method for implemented on the architecture shown in FIG. 9 for processing a page fault. At 1021, a front end core is communicatively coupled to an accelerator. As mentioned, the front end core of one embodiment executes a lightweight set of OS code and includes a TLB, a page walker module, page fault handler, and TLB shootdown handler. At 1022, memory access operations generated by the accelerator are detected by the front end core, which checks its TLB for an entry needed to handle the memory access. At 1023 the address mapping is determined (either via the TLB or via a memory access for the page table). If a page fault is detected because, for example, the requested page is not currently stored in a physical memory address space (but, for example, is stored on the hard drive), then at 1025 the requested page is loaded into memory. At 1026, the accelerator accesses the system memory for the requested page.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11B:
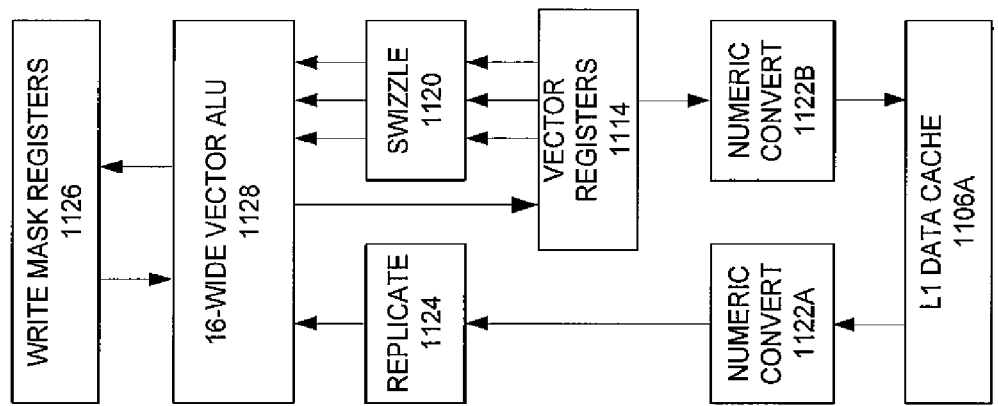
FIG. 11B is an expanded view of part of the processor core in FIG. 11A according to embodiments of the invention.
Figure 11A:
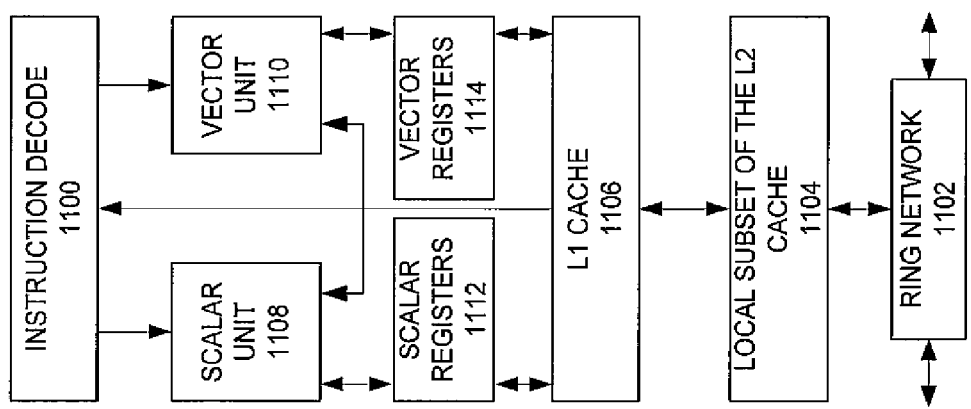
FIG. 11A is a block diagram of a single processor core, along with its connection to the on-die interconnect network and with its local subset of the Level 2 (L2) cache, according to embodiments of the invention.

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1410 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

We claim:

1. An apparatus comprising:
   front end hardware logic to couple to an accelerator, the front end hardware logic to receive and schedule tasks for execution on the accelerator, the front end hardware logic comprising:
   a translation lookaside buffer (TLB) to store virtual-to-physical address mappings for the accelerator, wherein the accelerator comprises a memory manager to submit one or more TLB lookup requests to the TLB of the front end hardware logic, and wherein the front end hardware logic is to perform all TLB lookup operations required by the accelerator, including mapping virtual to physical address on behalf of the accelerator in response to the accelerator requiring access to a system memory; and page walker circuitry to provide page walk services to the accelerator to determine virtual-to-physical address mappings.

2. The apparatus as in claim 1 wherein the front end hardware logic further comprises:

address translation circuitry to perform a virtual-to-physical address translation for one or more of the accelerator execution circuits by querying the TLB containing the mapping of virtual-to-physical addresses.

3. The apparatus as in claim 2 wherein the address translation circuitry is to cause the page walker circuitry to access a page table from a memory hierarchy of one or more processor cores if the query to the TLB fails to locate a translation for a particular virtual address, the memory hierarchy comprising a system memory and a plurality of cache levels.

4. The apparatus as in claim 3 wherein the front end hardware logic is to access the memory hierarchy of the one or more processor cores using the address translation.

5. The apparatus as in claim 1 further comprising:

context save/restore circuitry to save and restore a context associated with a task scheduled for execution on the accelerator.

6. The apparatus as in claim 3 wherein the plurality of cache levels include a first cache integral to at least one processor core and a second cache to be shared by two or more of the processor cores.

7. The apparatus as in claim 1 wherein the front end hardware logic is to detect a shootdown operation for a restricted page, the front end hardware logic to flush one or more entries in the TLB responsive to detecting the shootdown operation.

8. A non-transitory computer-readable medium having stored thereon hardware description language code to implement front end hardware logic for an accelerator, the front end hardware logic to:

receive and schedule tasks for execution on the accelerator; and perform memory management operations, including:

store virtual-to-physical address mappings for the accelerator in a translation lookaside buffer (TLB) of the front end hardware logic;

receive from a memory manager of the accelerator one or more TLB look up requests;

perform all TLB lookup operations required by the accelerator, including mapping virtual to physical address on behalf of the accelerator in response to the accelerator requiring access to a system memory; and provide page walk services to the accelerator to determine virtual-to-physical address mappings.

9. The computer-readable medium as in claim 1 wherein the front end hardware logic further comprises:

address translation circuitry to perform a virtual-to-physical address translation for one or more of the accelerator execution circuits by querying the TLB containing the mapping of virtual-to-physical addresses.

10. The computer-readable medium as in claim 9 wherein the address translation circuitry to cause the page walker circuitry to access a page table from a memory hierarchy of one or more processor cores if the query to the TLB fails to locate a translation for a particular virtual address, the memory hierarchy comprising a system memory and a plurality of cache levels.

11. The computer-readable medium as in claim 10 wherein the front end hardware logic is to access the memory hierarchy of the one or more processor cores using the address translation.

12. The computer-readable medium as in claim 8 further comprising hardware description language code to implement:

context save/restore circuitry to save and restore a context associated with a task scheduled for execution on the accelerator.

13. The computer-readable medium as in claim 10 wherein the plurality of cache levels include a first cache integral to at least one processor core and a second cache to be shared by two or more of the processor cores.

14. The computer-readable medium as in claim 8 wherein the front end hardware logic is to detect a shootdown operation for a restricted page, the front end hardware logic to flush one or more entries in the TLB responsive to detecting the shootdown operation.

* * * * *